United States Patent
Majonen

(10) Patent No.: US 8,537,037 B2
(45) Date of Patent: Sep. 17, 2013

(54) ADAPTIVE CONTROL FOR EFFICIENT HARQ MEMORY USAGE

(75) Inventor: Kari Tapio Majonen, Haukipudas (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/166,265

(22) Filed: Jun. 22, 2011

(65) Prior Publication Data

US 2012/0331241 A1 Dec. 27, 2012

(51) Int. Cl.
*H03M 7/30* (2006.01)

(52) U.S. Cl.
USPC .............................................. 341/87; 341/51

(58) Field of Classification Search
USPC .............. 341/51, 87; 714/748, 751; 375/262
See application file for complete search history.

(56) References Cited

U.S. PATENT DOCUMENTS

| | | | |
|---|---|---|---|
| 8,140,950 B2 * | 3/2012 | Mantha et al. ................ | 714/800 |
| 8,156,407 B2 * | 4/2012 | Franovici ..................... | 714/776 |
| 8,291,278 B2 * | 10/2012 | Cho et al. .................... | 714/751 |
| 2002/0107987 A1 | 8/2002 | Malm ........................... | 709/247 |
| 2008/0092008 A1 | 4/2008 | Widdup et al. ............... | 714/749 |
| 2010/0005356 A1 | 1/2010 | Cho et al. .................... | 714/749 |
| 2010/0272033 A1 * | 10/2010 | Fwu et al. .................... | 370/329 |

OTHER PUBLICATIONS

"Quantization", Robert M. Gray and David L. Neuhoff, IEEE Transactions on Information Theory, vol. 44, No. 6, Oct. 1998, pp. 2325-2383.

Danieli, et al., "Maximum Mutual Information Vector Quantization of Log-Likelihood Ratios for Memory Efficient HARQ Implementations", IEE Computer Society (2010), (pp. 30-39).

* cited by examiner

*Primary Examiner* — Brian Young
(74) *Attorney, Agent, or Firm* — Stanton IP Law

(57) ABSTRACT

There is determined an amount of available memory that is allocated for automatic repeat-request data. Then for each of a plurality of received data transmissions, an $n^{th}$ compression level is selected, in dependence at least in part on the amount of available memory, from among N possible compression levels for storing the respective received data transmission. In one specific embodiment each of the received data transmissions represents one HARQ process, and the $n^{th}$ compression level is selected from comparing an amount of memory needed to store the respective received data transmission and all other received data transmissions representing parallel HARQ processes as compressed according to the $n^{th}$ compression level against the determined amount of available memory. An algorithm iteratively checks the amount of memory needed for each of the N possible compression levels, from least compressed to most compressed in this specific embodiment.

19 Claims, 4 Drawing Sheets

US 8,537,037 B2

ADAPTIVE CONTROL FOR EFFICIENT HARQ MEMORY USAGE

TECHNICAL FIELD

The exemplary and non-limiting embodiments of this invention relate generally to wireless communication systems, methods, devices and computer programs, and more specifically relate to management of memory used for storing data related to HARQ processes.

BACKGROUND

The following abbreviations that may be found in the specification and/or the drawing figures are defined as follows:
3GPP third generation partnership project
ACK acknowledgement message
CRC cyclic redundancy check
DL downlink
eNodeB node B/base station in an E-UTRAN system
E-UTRAN evolved UTRAN (LTE)
HARQ hybrid automatic repeat request
HSPA high speed packet access
LTE 3GPP long term evolution
LTE-A long term evolution-advanced
NACK non or negative acknowledgement message
UE user equipment
UL uplink
UTRAN universal terrestrial radio access network One well-established technique for improving reliability in wireless communications is use of the ACK/NACK procedure whereby the receiver of a wireless message/data replies to the sender with confirmation (ACK) or not (NACK) whether the data was properly received. These serve to inform the original sender whether or not it needs to re-transmit the original message (or portion thereof). To limit the control signaling overhead these ACK and NACK messages occupy various adaptations of this basic automatic-repeat-request protocol have arisen and so the general process in many wireless systems such as HSPA, LTE and LTE-A is now termed HARQ.

FIG. 1 illustrates the general principle. Assume the sender is a network access node that sends a packet (packet A) to a receiver which is a UE, but the same process operates for packets sent uplink or even device-to-device communications which are generally neither uplink nor downlink. The sender stores packet A in its HARQ memory at 101 and sends it at 102. The receiver assesses whether packet A is properly received, such as by checking a CRC bit or bits included within the message itself. If the CRC check passes the receiver sends an ACK to the sender. If it fails as at 103 or if the receiver never receives a packet at a scheduled time the receiver at 104 sends a NACK to the sender. The ACK and NACK may take various forms: explicit bits on a HARQ indicator channel; on-time UL data from the UE may be considered an ACK for the most-recently sent DL data; lack of an on-time ACK may be interpreted at a NACK. These and various other arrangements are published in various wireless protocols so that both network and UE understand a common meaning for whether data was or was not correctly received.

HARQ implies that the sender at step 101, and sometimes also the receiver at step 103, of the data (packet A) must retain the packet until the relevant ACK is communicated. In the FIG. 1 example the sender needs to retain the packet for possible re-transmission, and for the case of a NACK the receiver may also retain the initially received (corrupted) packet A at 103 to aid in properly decoding the re-transmission of that same packet which the receiver expects to receive next. In what is termed as chase re-transmission, the re-transmitted packet is an exact copy of what was originally sent and NACK'd; whereas in incremental redundancy shown at FIG. 1 the re-transmission following the NACK at 104 uses a simple form of coding so different parts of the original packet are sent in different re-transmissions. FIG. 1 shows this as the sender creating at 105 packet A' from the original packet A (which was retrieved from the sender's HARQ memory) which is then sent at 106 in response to the NACK. In some incremental redundancy schemes these different versions on the packet can be uniquely decodable so that any version of the packet can be used to decode the whole packet; while other schemes utilize non-decodable re-transmissions meaning that UE needs the preceding versions of the packet in question to combine and decode with the incremental versions. FIG. 1 shows at 107 that the receiver retrieves packet A from its HARQ memory for use in decoding packet A'. But even with chase re-transmission the receiver might find it useful to retain the original packet for use in joint decoding with the re-transmitted packet. Regardless of which re-transmission scheme is in use, the corrupted version of the original packet is stored in the receiving party's local memory as shown at 103. This version is termed in the wireless arts as quantized soft bits, since they are retained at step 103 for possible combination with later (re-transmitted) versions of the data at step 107.

One issue that arises with HARQ protocol is the large memory requirements involved in order to fully utilize the improved reliability HARQ provides. Since memory and processing power are typically more limited in the UE than in the network access node the following will assume the UE is the data recipient, but these teachings are equally valid for both UE and network nodes. The trend in wireless communications has been for some time an increased data rate (as well as the size of the individual packets) and also an increase in the number of parallel HARQ processes (i.e. number of different separate packets that undergo re-transmission process at the same time). This has a significant impact on the total amount of memory which needs to be allocated for HARQ. Conventionally in HSPA and LTE the quantization level of the soft bits has typically been in the order of 5, or more, bits per soft bit.

Related to the memory capacity requirements are power requirements, since each memory access consumes power which at the UE comes from a finite portable source. When the memory to access for a given set of soft bits becomes too large there is a potential latency issue which might impact the UE's real-time processing of the packet re-combinations. The latter is particularly relevant for streaming video and similar data which exhibits both high data rate and tight timing requirements.

Past techniques and proposals to address the above HARQ memory issues have included not storing the earlier transmissions at all, which can retain the added reliability which HARQ offers only where the incremental redundant re-transmissions are uniquely decodable packets. Another technique that can be used e.g. in LTE time-division duplexing implementations with a large number of parallel HARQ processes is to reserve some memory for HARQ but an amount insufficient for worst-case performance. But in a highly loaded scenario this means the original packet from some HARQ processes is never stored and if that packet happens to generate a NACK the re-transmission procedure might not resolve the corrupted data. Still a third technique is to apply fewer bits to represent the soft bits when storing in the HARQ memory. This can be seen as a compromise between complexity and performance.

SUMMARY

In a first exemplary embodiment of the invention there is an apparatus comprising a processing system including at least one processor and a memory storing a set of computer instructions. In this embodiment the processing system is arranged to determine an amount of available memory that is allocated for storage of automatic repeat-request data; and for each of a plurality of received data transmissions, to select an $n^{th}$ compression level from among N possible compression levels for storing the respective received data transmission in dependence at least in part on the determined amount of available memory.

In a second exemplary embodiment of the invention there is a method comprising: determining an amount of available memory that is allocated for storage of automatic repeat-request data; and for each of a plurality of received data transmissions, selecting an $n^{th}$ compression level from among N possible compression levels for storing the respective received data transmission in dependence at least in part on the determined amount of available memory.

In a third exemplary embodiment of the invention there is a computer readable memory storing a set of instructions, which when executed by an apparatus causes the apparatus to determine an amount of available memory that is allocated for storage of automatic repeat-request data that is available; and for each of a plurality of received data transmissions, to select an $n^{th}$ compression level from among N possible compression levels for storing the respective received data transmission in dependence at least in part on the determined amount of available memory.

In a fourth exemplary embodiment of the invention there is an apparatus comprising a processing system comprising at least one processor and a memory storing a set of computer instructions. In this embodiment the processing system is arranged, based on at least one of power consumption requirements and processing latency requirements, to select a first mode over a second mode for compressing received data transmissions, in which the first mode operates to compress each received data transmission at a maximum compression level selected from among N possible compression levels without regard to an amount of available memory that is allocated for storage of automatic repeat-request data. The second mode is different from the first mode. The processing system is further arranged in this embodiment to compress each of a plurality of received data transmissions according to the first mode and to store each of the plurality of compressed received data transmissions in the memory that is allocated for storage of automatic repeat-request data.

In a fifth exemplary embodiment of the invention there is a method comprising: based on at least one of power consumption requirements and processing latency requirements, selecting a first mode over a second mode for compressing received data transmissions, in which the first mode operates to compress each received data transmission at a maximum compression level selected from among N possible compression levels without regard to an amount of available memory that is allocated for storage of automatic repeat-request data. The second mode is different from the first mode. Further in the method is compressing each of a plurality of received data transmissions according to the first mode and storing each of the plurality of compressed received data transmissions in the memory that is allocated for storage of automatic repeat-request data.

These and other embodiments and aspects are detailed below with particularity.

DETAILED DESCRIPTION

Figure 1:
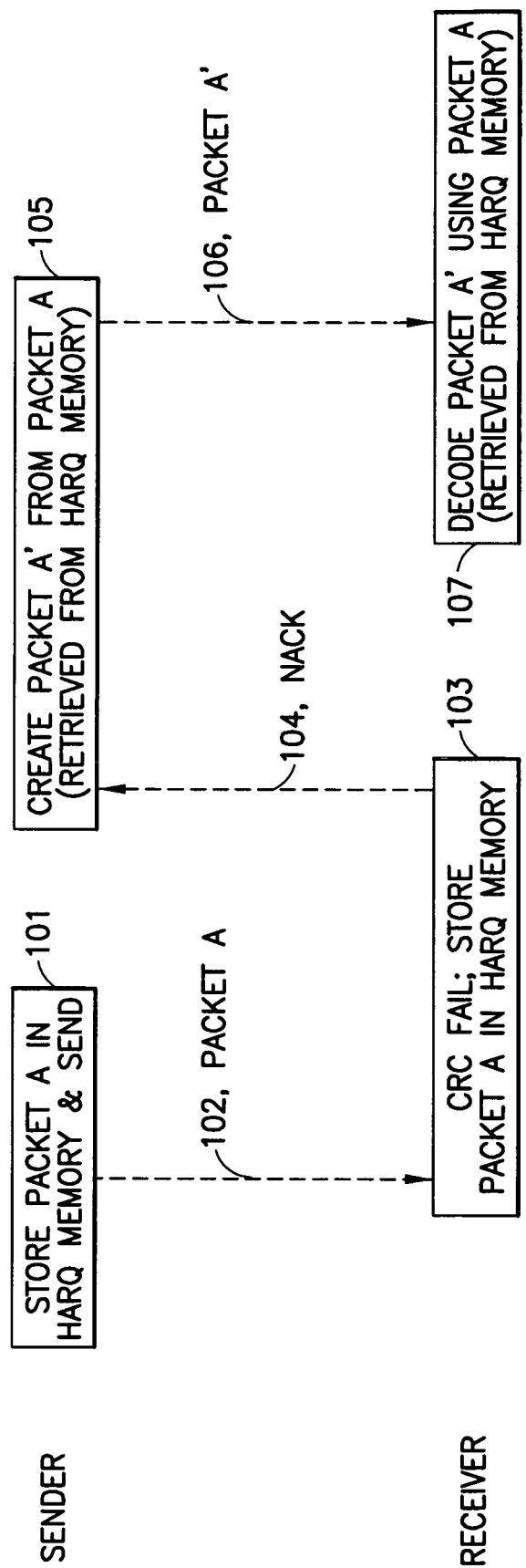
FIG. 1 is a schematic diagram of one HARQ process illustrating storage requirements at both sender and receiver.

In general, previous HARQ memory management techniques have been static in nature. Exemplary embodiments of these teachings present an adaptive technique to manage the use of HARQ memory based on instantaneous loading. Such exemplary embodiments may be considered to provide a compromise, balancing complexity in managing the HARQ memory and performance of the HARQ process (data reliability) against flexibility at the receiver (e.g., the mobile user equipment) to adjust behavior such as to reduce power consumption or processing commitment/processing latency.

Some prior art techniques as detailed in background above compress the stored HARQ data uniformly; all data for the different HARQ processes is subjected to the same compression level. The compression level and the amount of memory reserved for HARQ is set so that under normal and possibly also under heavy loading conditions all of the HARQ data can be stored in the reserved HARQ memory. But if the loading exceeds the design parameters of HARQ data volume and reserved memory capacity, some HARQ data will be lost for lack of adequate storage capacity and the prior art of which the inventor is aware provides no way to dynamically select which HARQ data is retained and which is lost. Embodiments of these teachings dynamically change the data compression level per HARQ process depending on the current loading of the reserved HARQ memory. The compression level is not fixed per HARQ process but instead is changeable depending on how much residual (unused) capacity remains in the reserved HARQ memory. This allows optimization between the different transmissions which are each associated with a HARQ process.

Exemplary embodiments of the invention may be implemented by a LTE modem using hardware and adaptation software to practice the invention detailed herein. Additionally, further optimization may be obtained by routing ACK/NACK information from the output of the channel decoder also to the HARQ module. This would allow the UE or other implementing device to release allocated memory for the case in which the transmission was received correctly since there will not be any re-transmissions expected for that correctly-received packet and so no need to store it in the HARQ memory.

First is outlined the compression process in general, which reduces the total number of soft bits which are stored in the HARQ memory. As noted above five bits is a typical word length of soft bits for a given HARQ process; by compression this word length can be reduced for example to four or even three. Non-integer word lengths can also be achieved by combining more than one soft bits together. When these compressed soft bits are retrieved from the HARQ memory they are de-compressed back to the original representation (e.g., five bits) as is well known in the wireless arts.

According to an embodiment of these teachings the compression level of the soft bits are adaptable per HARQ process based on the current state of the HARQ memory, that is, how much residual HARQ memory is currently available for storage of new soft bits. The compression may also be based on additional parameters apart from available HARQ memory, such as for example the UL-DL configuration of the current (LTE TDD) radio frame since from the receiver's perspective a higher number of DL subframes in a frame tend to predict a greater demand for HARQ memory in the immediate future. In many cellular systems (e.g., LTE) the UE has advance warning of the UL-DL configuration for the next radio frame; in LTE that ratio is semi-statically configured via radio resource control signaling.)

According to one exemplary embodiment of these teachings the receiver/UE first compares the available HARQ memory to the total requirements for each compression level, for each new HARQ process for which bits are newly stored. Since the best performance is achieved with the largest amount of bits to represent a soft-bit (meaning the lowest compression), this lowest compression level is used as the UE's starting point.

For example, assume the UE has the options to use bit widths of five, four and three bits per soft bit in each HARQ process. The UE first compares the total available HARQ memory to the calculated memory requirement if for the most recently initiated HARQ process five bits per soft bit were stored. If that calculated memory requirement exceeds the available HARQ memory then the UE repeats the calculation and comparison for four bits per soft bit; and if that is still is too large for the available HARQ memory the UE repeats again for three bits per soft bit. In a particular embodiment these calculations of memory requirements also take into account possible implementation choices around how the specific HARQ implementation (chase, incremental redundancy) affects the packet lengths to be stored. In many cases that selection will be built into the implementing software, but increasingly user devices are multi-radio capable and different radio technologies may utilize different re-transmission schemes so the implementing software can take those differences in HARQ memory usage specifically into account based on which is the relevant radio for the current HARQ process.

Note that the choice of 5, 4, or 3 bits per soft bit in the above example is on a per HARQ process; if many or all HARQ processes are in the end compressed at the same level that is a result of multiple compression decisions which are only tangentially related to one another (since each successive HARQ process examines the amount of available memory which is affected by the compression level of previous HARQ processes still retained in the HARQ memory). Thus the compression level for every starting HARQ process is assessed separately, and also for each new HARQ process the available free memory is tracked. As implemented this approach leads to the lowest compression being used (meaning best performance/reliability) when there is an abundance of available HARQ memory, and a higher compression level only for those HARQ processes begun once the HARQ memory begins to fill to near its capacity. But since HARQ memory is highly dynamic, there are stored bits being dropped constantly as the receiver/UE sends an ACK for re-transmitted data after it passes its CRC or other check.

Figure 2:
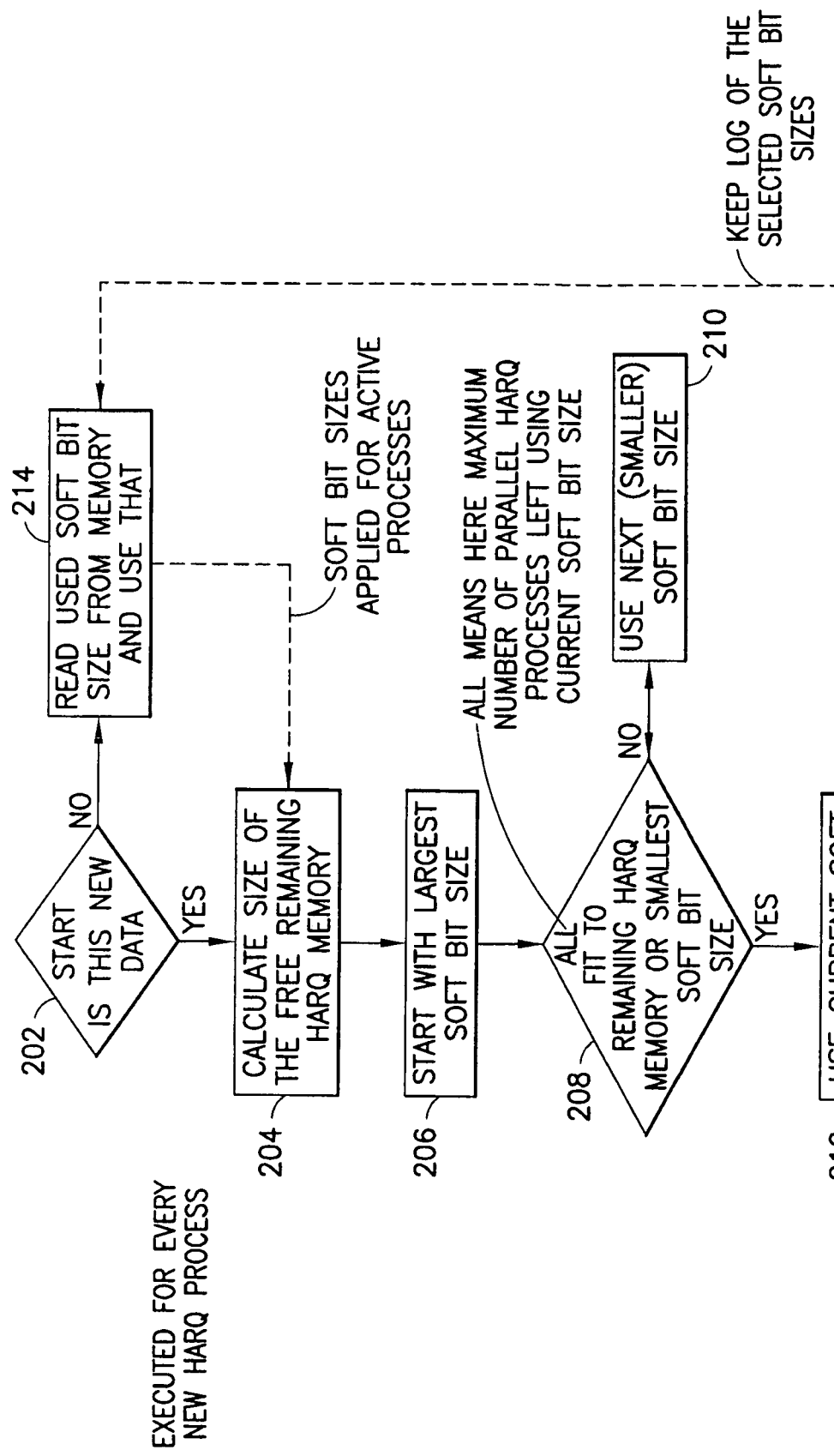
FIG. 2 is a flow diagram illustrating dynamic compression control with fixed compression per HARQ process according to an exemplary embodiment of the invention.

A specific implementation of an algorithm which when stored in a non-transient memory of a UE or other radio device is shown at FIG. 2. This algorithm operates on every wirelessly received packet or message which is subject to an ACK or NACK response. A packet/message is received and at 202 is assessed whether this is new data (e.g., packet A of FIG. 1) or not (e.g., packet A' of FIG. 1). If yes then at block 204 the radio device/processor calculates the size of the free HARQ memory which is available for storing bits representing that newly received packet/message. As in the example above there are a finite number of compression options for the radio device to run through in its assessment; five, four, three, or in the case that bits from different HARQ processes are combined into a joint soft bit even a non-integer number of bits per HARQ process. At 206 the radio device/processor begins running through those finite options, preferably beginning with the largest soft bit size (least compression) and proceeding iteratively at blocks 208 and 210 with each successive next level of compression until the compression level will fit into the available memory at block 208.

If there is only one ongoing HARQ process then the comparison at block 208 is simply the number of bits for the current HARQ process against the available HARQ memory. The more practical case for modern radios is that there are multiple parallel HARQ processes ongoing. So for example if the UL-DL configuration gives seven DL subframes in a frame and the HARQ process on which the algorithm of FIG. 2 is currently operating is the first of those downlink subframes, the comparison at block 208 is not just for the HARQ process relating to that first downlink subframe but is to check whether the available HARQ memory is sufficient to store bits for the HARQ processes for all seven of those downlink subframes, if in fact they were all compressed at the level used at block 206 which is being evaluated against the available memory at block 208.

Consider an example for the seven downlink subframes above in which there are only two compression levels available to the radio device: 25 bits or 20 bits per HARQ process. On the first iteration for the first HARQ process associated with the first downlink subframe, block 206 yields 25 bits and block 208 checks whether there is adequate HARQ memory to store 175=25*7 bits, since there are expected to be altogether seven parallel HARQ processes in this example. If there is space for only 159 bits in the available HARQ memory the calculated 175 bits is too great and so the smallest bit size is used per block 208 since it is the only other bit size possible, and 20 bits are allowed for this first HARQ process which block 212 uses for the actual bit compression and storage into the HARQ memory.

Assuming no already-stored bits for other HARQ processes are dropped, this leaves 139 bits of available HARQ memory for the remaining six parallel HARQ processes. The second, third and fourth HARQ processes are similarly evaluated for respective six, five and four remaining parallel HARQ processes to be stored, each with the same result of 20 bits per HARQ process being allowed. When the fifth HARQ process is checked at block 206 there is then space for 79 bits in the HARQ memory and there are three parallel HARQ processes still to account. For the lowest compression block 206 computes 75=25*3 bits will be needed which block 208 shows the available HARQ memory of 79 bits is sufficient to store, and so the fifth HARQ process is allowed the lower compression of 25 bits. There is also sufficient HARQ memory to store the other remaining two HARQ processes at the lowest compression, leaving only four unused bit positions in the available HARQ memory after all seven parallel HARQ processes are stored (four at 20 bits each and three at 25 bits each).

The dotted line from block 212 of FIG. 2 tells that a log is kept of the selected soft bit sizes. In the above example this would be 20 bits each for HARQ processes #1 through #4 and 25 bits each for HARQ processes #5 through #7. If in fact the data received at block 202 is not new data but instead a re-transmission of previously received data such as packet A' of FIG. 1, then the algorithm of FIG. 2 accesses that log and re-uses at block 214 the same soft bit size as was used to store the soft bits of the originally sent data. Then the memory size is calculated and the first bit size attempted at block 206 for the re-transmitted data is the soft bit size used to store the originally sent data.

Re-using the same soft bit size for the retransmission as at block 214 of FIG. 2 is just one possible embodiment, appropriate for the case in which compression for HARQ processes is fixed for certain re-transmissions. This may not always be the case, and so in those instances where compression within a HARQ process is allowed to vary between the original transmission and its re-transmission (or between multiple re-transmissions within the same HARQ process) the log of selected soft bit sizes may be ignored and the re-transmissions are processed through the FIG. 2 algorithm for compression purposes as if they were each new data.

Testing compression level against the available memory for each HARQ process as in FIG. 2 causes the algorithm to operate at a faster rate than a more static approach which might compress data from all HARQ processes at some common compression level, but as demonstrated in the example above for seven parallel HARQ processes it allows a much more flexible use of the memory. This further allows better control, for example to limit power consumption or to budget less memory for HARQ to design for an assumed worst case scenario.

Of course, other techniques for managing HARQ memory can also be used in conjunction with the per-HARQ process compression algorithm detailed by example above. For example, the output of the channel decoder which tests whether the transmission was received correctly or not can be interfaced to the HARQ functionality, so that immediately the HARQ memory used for a packet which is received correctly can be immediately made available, giving a larger available memory at block 204 which may then possibly allow a larger soft bit size for the next HARQ process and consequently potentially improved performance.

Exemplary embodiments of these teachings provide the technical effect of being system independent, and so can readily be made applicable for HSPA, LTE, LTE-A, device-to-device, and other communication systems. As noted above the flexibility this algorithm entails provides the technical effect of allowing optimization between performance (detection), power consumption, memory requirements and processing latency. In some implementations the algorithm may be configurable to revert to a more static (conventional) compression of the soft bits as an added bit of flexibility. And finally implementation is seen to be possible via software only in many cases, using the hardware of legacy devices for compressing and storing but under new control by the algorithm detailed herein.

Figure 3:
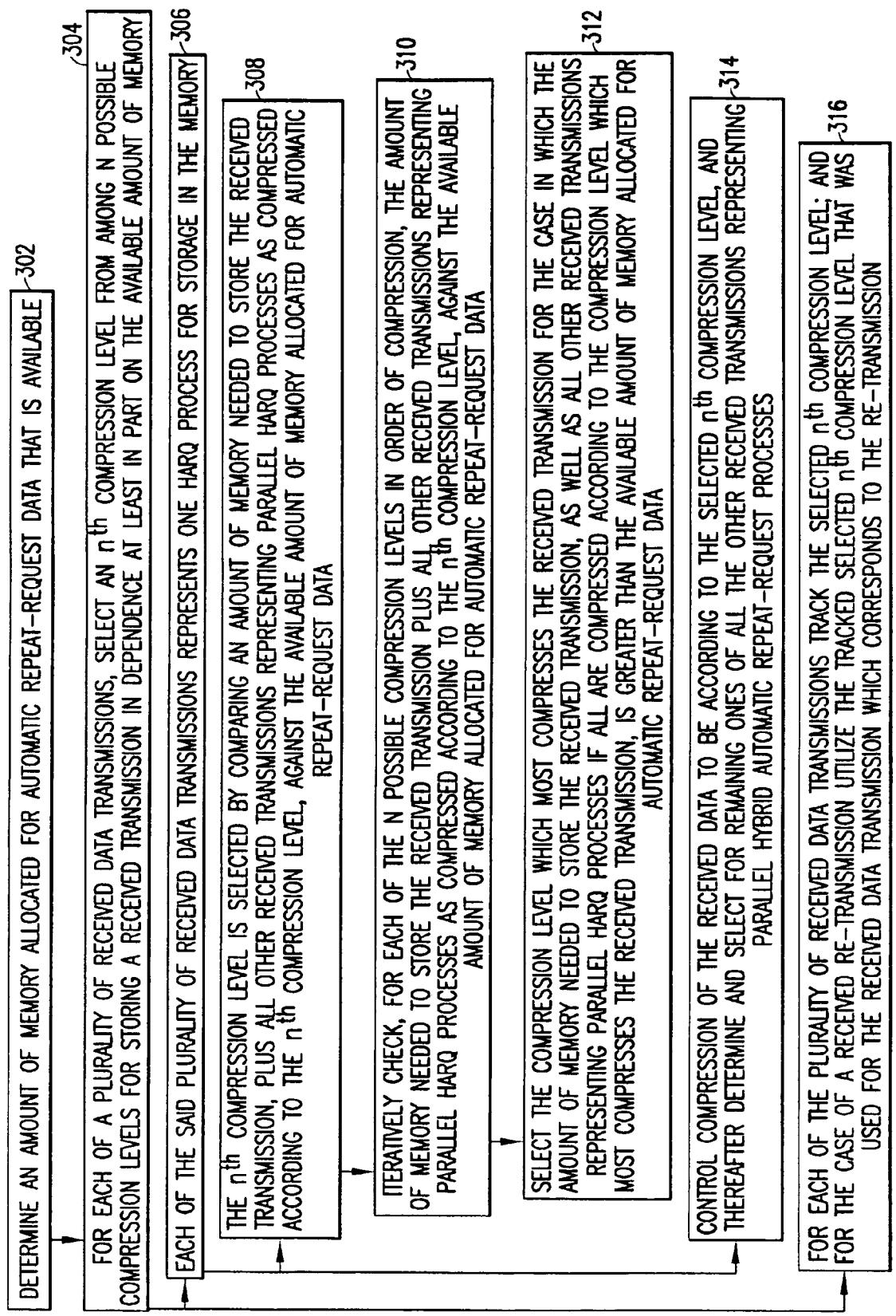
FIG. 3 is a logic flow diagram illustrating the operation of a method, and a result of execution by an apparatus of a set of computer program instructions embodied on a computer readable memory, in accordance with certain exemplary embodiments of this invention.
Figure 4:
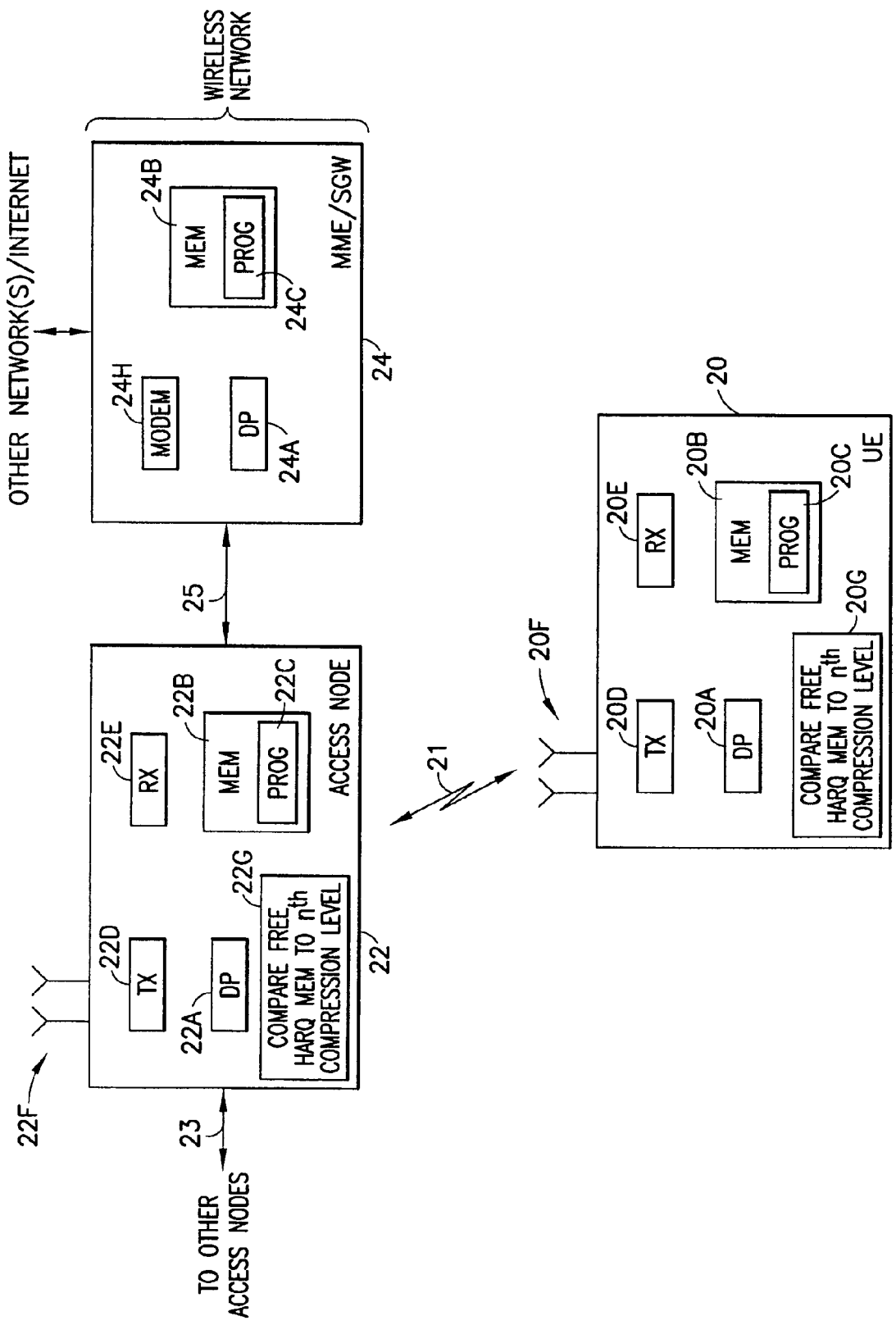
FIG. 4 is a simplified block diagram of a UE and an eNodeB which are exemplary electronic devices suitable for use in practicing the exemplary embodiments of the invention.

FIG. 4 is a logic flow diagram which summarize the above various exemplary embodiments of the invention. FIG. 3 may be considered to illustrate the operation of a method, and a result of execution of a computer program stored in a computer readable memory, and a specific manner in which components of an electronic device are configured to cause that electronic device to operate, whether such an electronic device is the UE, a network element such as a base station, or one or more components thereof such as a modem, chipset, or the like. The various blocks shown in FIG. 3 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

In the FIG. 3 at block 302 there is determined an amount of memory allocated for automatic repeat-request data that is available. And at block 304, for each of a plurality of received data transmissions, there is selected an $n^{th}$ compression level from among N possible compression levels for storing a received transmission in dependence at least in part on the available amount of memory. N is an integer representing the finite number of compression levels available to the host apparatus, which in the above examples N=3 representing five, four and three bits per soft bit. In other embodiments N may be a different number greater than one.

Further portions of FIG. 3 explore the various example embodiments detailed with particularity above. Block 306 stipulates that each of the said plurality of received data transmissions represents one HARQ process for storage in the memory allocated for automatic repeat-request data. Block 308 states that the $n^{th}$ compression level is selected by comparing an amount of memory needed to store the received transmission, plus all other received transmissions representing parallel hybrid automatic repeat-request processes as compressed according to the $n^{th}$ compression level, against the available amount of memory allocated for automatic repeat-request data.

Block 310 gives further detail of block 308 in that the algorithm which does the determining and selecting of blocks 302 and 304 iteratively checks, for each of the N possible compression levels in order of compression, the amount of memory needed to store the received transmission plus all other received transmissions representing parallel hybrid automatic repeat-request processes as compressed according to the $n^{th}$ compression level, against the available amount of memory allocated for automatic repeat-request data. By the example given for FIG. 2 that order of compression is least compressed to most compressed.

Block 312 gives further detail from block 208 of FIG. 2, namely that the algorithm selects the compression level which most compresses the received transmission for the case in which the amount of memory needed to store the received transmission as well as all other received transmissions representing parallel hybrid automatic repeat-request processes, which are all hypothetically compressed according to the compression level which most compresses the received transmission, is greater than the available amount of memory allocated for automatic repeat-request data.

Since as was detailed above the invention may be embodied in tangibly stored software, block 314 tells the further step of controlling compression of the received data to be according to the selected the $n^{th}$ compression level, and as explained above with respect to seven parallel downlink subframes to thereafter determine and select as noted at blocks 302 and 304 (and any other of the optional intervening blocks of FIG. 3) for remaining ones of the all other received transmissions representing parallel hybrid automatic repeat-request processes.

Block 214 of FIG. 2 is further detailed at block 316 of FIG. 3: for each of the plurality of received data transmissions the selected $n^{th}$ compression level is tracked; and for the case of a received re-transmission what is utilized is the tracked selected $n^{th}$ compression level that was used for the received data transmission which corresponds to the re-transmission. As noted above, if different compression may be used within a single HARQ process then the received re-transmission is treated for compression purposes no different than the original data transmission of that same HARQ process.

In another embodiment of the invention the modem or UE has two different modes for HARQ compression. One mode, termed for clarity as the first mode, is less power consuming and/or has a lower processing latency as compared to the second mode. The second mode may be static, or dynamic such as that detailed above for FIG. 2, or may be some other compression algorithm that selects which compression based on the available HARQ memory. In any case the second mode is different from the first mode, because the first mode selects a compression level from among the N compression levels without regard to the available HARQ memory and in the second mode the compression level is always the lowest possible compression given the available HARQ memory. Considered against the case in which FIG. 2 is the second mode, it is clear that the algorithm of FIG. 2 would impose a bit higher latency than simply selecting for incoming data packets the highest compression level. And since the highest compression level is selected in the first mode in all instances, there is no reason to check the amount of available HARQ memory.

More specifically, in this embodiment the first mode for compressing HARQ data is selected based on power consumption requirements, or based on processing latency requirements, or possibly even both. In one embodiment the first mode and the second mode are different portions of a singular algorithm (e.g., with common portions for accessing the compression process steps and the storing process steps), and in other embodiments they may each be implemented by separate stand-alone algorithms. However implemented, the first mode operates to compress each received data transmission at a maximum compression level. That maximum compression level is selected by the first mode, from among N possible compression levels, without regard to an amount of available memory that is allocated for automatic repeat-request data. Then each of a plurality of received data transmissions are compressed according to the first mode (maximum compression=least amount of soft bits) and each of the plurality of compressed received data transmissions are stored in the memory that is allocated for HARQ data.

As noted above, as compared to the first mode, in various embodiments the second mode may be characterized by drawing a higher power consumption, by exhibiting a higher processing latency, by selecting a compression level in dependence on the amount of available memory that is allocated for automatic repeat-request data, or by any combination of these.

Like the FIG. 2 embodiment and variations thereof, this embodiment may also be implemented in a user equipment, or in one or more components thereof such as for example a modem including its implementing software.

Reference is now made to FIG. 4 for illustrating a simplified block diagram of various electronic devices and apparatus that are suitable for use in practicing the exemplary embodiments of this invention. In FIG. 4 an access node 22 such as a base station in the position of the sender is adapted for communication over a wireless link 21 with an apparatus, such as a mobile terminal or UE 20 in the position of the receiver. The access node 22 may be any access node (including frequency selective repeaters) of any wireless network such as LTE, LTE-A, GSM, GERAN, WCDMA, and the like. The operator network of which the access node 22 is a part may also include a network control element such as a mobility management entity MME and/or serving gateway SGW 24 or radio network controller RNC which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C or other set of executable instructions, communicating means such as a transmitter TX 20D and a receiver RX 20E for bidirectional wireless communications with the eNodeB 22 via one or more antennas 20F. Also stored in the MEM 20B at reference number 20G is the algorithm for comparing, for each received data transmission representing a new HARQ process, the free memory allocated for HARQ to the nth compression level out of N available compression levels. As detailed above with respect to FIG. 2, that the algorithm can run through all N compression levels does not imply that it does so for each received data transmission; it makes a selection once the tested compression level is deemed to fit within the free HARQ memory.

The access node 22 also includes processing means such as at least one data processor (DP) 22A, storing means such as at least one computer-readable memory (MEM) 22B storing at least one computer program (PROG) 22C or other set of executable instructions, and communicating means such as a transmitter TX 22D and a receiver RX 22E for bidirectional wireless communications with the UE 20 via one or more antennas 22F. The access node 22 also stores at block 22G a similar algorithm for use in the HARQ processes it tracks for data transmissions it receives from the illustrated UE 20 and other UEs.

While not particularly illustrated for the UE 20 or access node 22, those devices are also assumed to include as part of their wireless communicating means a modem and/or a chipset which may or may not be inbuilt onto an RF front end chip within those devices 20, 22 and which also operates utilizing the algorithm detailed herein.

At least one of the PROGs 20C in the UE 20 is assumed to include a set of program instructions that, when executed by the associated DP 20A, enable the device to operate in accordance with the exemplary embodiments of this invention, as detailed above. The access node 22 may also have software stored in its MEM 22B to implement certain aspects of these teachings. In these regards the exemplary embodiments of this invention may be implemented at least in part by computer software stored on the MEM 20B, 22B which is executable by the DP 20A of the UE 20 and/or by the DP 22A of the eNodeB 22, or by hardware, or by a combination of tangibly stored software and hardware (and tangibly stored firmware). Electronic devices implementing these aspects of the invention need not be the entire devices as depicted at FIG. 4 or may be one or more components of same such as the above described tangibly stored software, hardware, firmware and DP, or a system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-A system, as noted above the exemplary embodiments of this invention may be used with various other CA-type wireless communication systems.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
a processing system comprising at least one processor and a memory storing a set of computer instructions, in which the processing system is arranged to:
determine an amount of available memory that is allocated for storage of hybrid automatic repeat-request (HARQ) data; and
separately select, for each of plurality of parallel HARQ processes, an $n^{th}$ compression level from among N possible compression levels for storing data transmissions associated with the respective HARQ process, where the selecting for each of the parallel HARQ processes is in dependence at least in part on the amount of available memory;
wherein the respective $n^{th}$ compression level is selected by comparing an amount of memory needed to store the data transmissions associated with the respective HARQ process and all other data transmissions associated with other HARQ processes of the plurality of parallel HARQ processes.

2. The apparatus according to claim 1, in which the processing system is configured to select the respective $n^{th}$ compression level by comparing an amount of memory needed to store the data transmissions associated with the respective HARQ process and all other data transmissions associated with the respective parallel HARQ processes as compressed according to the respective $n^{th}$ compression level against the determined amount of available memory.

3. The apparatus according to claim 2, in which the processing system is configured to determine and select as said according to an algorithm which iteratively checks, for each of the N possible compression levels in order of compression, the amount of memory needed to store the data transmissions associated with the respective HARQ process and all other data transmissions associated with all other of the parallel HARQ processes as compressed according to a same $n^{th}$ compression level against the determined amount of available memory.

4. The apparatus according to claim 3, in which the order of compression is least compressed to most compressed.

5. The apparatus according to claim 3, in which the algorithm selects the compression level which most compresses the data transmissions for the case in which the amount of memory needed to store the data transmissions associated with the respective HARQ process and all other data transmissions associated with all other of the parallel HARQ processes as compressed according to the compression level which most compresses is greater than the determined amount of available memory.

6. The apparatus according to claim 2, in which the processing system is further arranged to:
control compression of the data transmissions associated with the respective HARQ process to be according to the selected respective $n^{th}$ compression level and thereafter determine and select as said for remaining ones of the data transmissions associated with the remaining parallel HARQ processes.

7. The apparatus according to claim 1, in which the processing system is further arranged to:
for each of the plurality data transmissions associated with a respective HARQ process, track the selected respective $n^{th}$ compression level; and
for the case of a data re-transmission associated with the respective HARQ process, utilize the tracked selected $n^{th}$ compression level that was used for the data transmission which corresponds to the data re-transmission.

8. The apparatus according to claim 1, in which the apparatus comprises a modem disposed in a user equipment.

9. A method, comprising:
determining an amount of available memory that is allocated for storage of hybrid automatic repeat-request (HARQ) data: and
separately selecting, for each of a plurality of parallel HARQ processes, an $n^{th}$ compression level from among N possible compression levels for storing data transmissions associated with the respective HARQ process, where the selecting for each of the parallel HARQ processes is in dependence at least in part on the amount of available memory;
wherein each respective $n^{th}$ compression level is selected by comparing an amount of memory needed to store the data transmissions associated with the respective HARQ process and all other data transmissions associated with other HARQ processes of the plurality of parallel HARQ processes.

10. The method according to claim 9, in which
selecting the respective $n^{th}$ compression level comprises comparing an amount of memory needed to store data transmissions associated with the respective HARQ process and all other received data transmissions associated with the respective parallel HARQ processes as compressed according to the respective $n^{th}$ compression level against the determined amount of available memory.

11. The method according to claim 10, in which the determining and selecting are according to an algorithm which iteratively checks, for each of the N possible compression levels in order of compression, the amount of memory needed to store data transmissions associated with the respective HARQ process and all other data transmissions associated with all other of the parallel HARQ processes as compressed according to a same $n^{th}$ compression level against the determined amount of available memory.

12. The method according to claim 11, in which the algorithm selects the compression level which most compresses the data transmissions for the case in which the amount of memory needed to store the data transmissions associated with the respective HARQ process and all other data transmissions associated with all others of the parallel HARQ processes as compressed according to the compression level which most compresses is greater than the determined amount of available memory.

13. The method according to claim 10, further comprising:
controlling compression of the data transmission associated with the respective HARQ process to be according to the selected respective $n^{th}$ compression level and thereafter determining and selecting as said for remaining ones of the data transmissions associated with the remaining parallel HARQ processes.

14. The method according to claim 9, further comprising:
for each of the plurality of data transmissions associated with a respective HARQ process, tracking the selected respective $n^{th}$ compression level; and
for the case of a data re-transmission associated with the respective HARQ process, utilizing the tracked selected $n^{th}$ compression level that was used for the data transmission which corresponds to the data re-transmission.

15. The method according to claim 9, in which the method is executed by a modem disposed in a user equipment.

16. A computer readable memory tangibly storing a set of instructions, which when executed by an apparatus causes the apparatus to
determine an amount of available memory that is allocated for storage of hybrid automatic repeat-request (HARQ) data; and
separately select, for each of a plurality of parallel HARQ processes, an $n^{th}$ compression level from among N possible compression levels for storing data transmissions associated with the respective HARQ process, where the selecting for each of the parallel HARQ processes is in dependence at least in part on the determined amount of available memory;
wherein each respective $n^{th}$ compression level is selected by comparing an amount of memory needed to store the data transmissions associated with the respective HARQ process and all other data transmissions associated with other HARQ processes of the plurality of parallel HARQ processes.

17. The computer readable memory according to claim 16, in which
the respective $n^{th}$ compression level is selected by comparing an amount of memory needed to store the data transmissions associated with the respective HARQ process and all other data transmissions associated with the respective parallel HARQ processes as compressed according to the respective $n^{th}$ compression level against the determined amount of available memory.

18. The computer readable memory according to claim 17, in which the set of instructions when executed causes the apparatus to determine and select as said according to an algorithm which iteratively checks, for each of the N possible compression levels in order of compression, the amount of memory needed to store the data transmissions associated with the respective HARQ process and all other data transmissions associated with all other of the parallel HARQ processes as compressed according to a same $n^{th}$ compression level against the determined amount of available memory.

19. The computer readable memory according to claim 17, in which the set of instructions when executed further causes the apparatus to:
control compression of the data transmissions associated with the respective HARQ process to be according to the selected respective $n^{th}$ compression level and thereafter determine and select as said for remaining ones of the data transmissions associated with the remaining parallel HARQ processes.

* * * * *

UNITED STATES PATENT AND TRADEMARK OFFICE
CERTIFICATE OF CORRECTION

| | |
|---|---|
| PATENT NO. | : 8,537,037 B2 |
| APPLICATION NO. | : 13/166265 |
| DATED | : September 17, 2013 |
| INVENTOR(S) | : Kari Tapio Majonen |

It is certified that error appears in the above-identified patent and that said Letters Patent is hereby corrected as shown below:

In the claims

Col. 11, line 50, "wherein the respective" should be changed to --wherein each respective--.

Signed and Sealed this
Eighteenth Day of February, 2014

Michelle K. Lee
*Deputy Director of the United States Patent and Trademark Office*